United States Patent
Lagorgette et al.

(10) Patent No.: US 10,228,658 B2
(45) Date of Patent: Mar. 12, 2019

(54) MOTOR MODULE FOR WATCHES

(71) Applicant: ETA SA Manufacture Horlogere Suisse, Grenchen (CH)

(72) Inventors: Pascal Lagorgette, Bienne (CH); Raphael Balmer, Vicques (CH)

(73) Assignee: ETA SA Manufacture Horlogère Suisse, Grenchen (CH)

(*) Notice: Subject to any disclaimer, the term of this patent is extended or adjusted under 35 U.S.C. 154(b) by 27 days.

(21) Appl. No.: 15/357,172

(22) Filed: Nov. 21, 2016

(65) Prior Publication Data
US 2017/0176945 A1    Jun. 22, 2017

(30) Foreign Application Priority Data
Dec. 21, 2015  (EP) .................................. 15201458

(51) Int. Cl.
| | |
|---|---|
| *G04C 3/14* | (2006.01) |
| *H02K 37/24* | (2006.01) |
| *G04C 3/00* | (2006.01) |
| *G04B 19/02* | (2006.01) |
| *G04B 33/06* | (2006.01) |
| *G04B 35/00* | (2006.01) |

(Continued)

(52) U.S. Cl.
CPC .............. *G04C 3/146* (2013.01); *G04C 3/00* (2013.01); *G04C 3/14* (2013.01); *H02K 37/24* (2013.01); *G04B 13/02* (2013.01); *G04B 19/02* (2013.01); *G04B 19/04* (2013.01); *G04B 29/04* (2013.01); *G04B 33/06* (2013.01); *G04B 35/00* (2013.01)

(58) Field of Classification Search
CPC . G04C 3/00; G04C 3/14; G04C 3/146; H02K 37/24; G04B 29/04; G04B 19/04
See application file for complete search history.

(56) References Cited

U.S. PATENT DOCUMENTS

| | | | |
|---|---|---|---|
| 4,465,378 A | | 8/1984 | Maurer et al. |
| 4,681,464 A | * | 7/1987 | Ray .......................... G04C 3/00 368/157 |

(Continued)

FOREIGN PATENT DOCUMENTS

| | | | | |
|---|---|---|---|---|
| EP | 0679970 A1 | * | 11/1995 | ............. G04C 3/146 |
| EP | 2 813 904 A1 | | 12/2014 | |
| FR | 2 518 775 | | 6/1983 | |

OTHER PUBLICATIONS

European Search Report dated Jun. 17, 2016 in European Application 15201458.5, filed on Dec. 21, 2015 (with English Translation of Categories of cited documents).

*Primary Examiner* — Daniel Wicklund
(74) *Attorney, Agent, or Firm* — Oblon, McClelland, Maier & Neustadt, L.L.P.

(57) ABSTRACT

A motorization group including power and control devices, and a motor module for watches, with a motor with a coil driving an output wheel set on an output arbor, this motor module includes main mechanical and electrical connectors to a structure or another motor module, and flat links cooperating with another motor module, each coil being electrically connected to two main connectors or to two flat links, more particularly, the flat links of the motor modules are arranged for an electrical connection, a main motor module carrying a main arbor parallel to each output arbor, electrically connected by main connectors or flat links, either to the structure, or to another motor module.

14 Claims, 9 Drawing Sheets

(51) Int. Cl.
*G04B 19/04* (2006.01)
*G04B 13/02* (2006.01)
*G04B 29/04* (2006.01)

(56) References Cited

U.S. PATENT DOCUMENTS

| | | | | | |
|---|---|---|---|---|---|
| 4,969,133 | A | * | 11/1990 | Triponez | G04C 3/008 368/110 |
| 5,172,349 | A | * | 12/1992 | Triponez | G04C 3/008 368/157 |
| 6,025,660 | A | * | 2/2000 | Guerin | G04C 3/143 310/114 |
| 7,057,977 | B1 | * | 6/2006 | Muller | G04C 3/008 310/112 |
| 2004/0046463 | A1 | * | 3/2004 | Takemoto | H02K 1/141 310/254.1 |
| 2008/0018208 | A1 | * | 1/2008 | Zafferri | H02K 37/14 310/49.02 |
| 2012/0236692 | A1 | * | 9/2012 | Kallestad | G04C 3/00 368/34 |
| 2014/0362671 | A1 | | 12/2014 | Lagorgette et al. | |
| 2015/0092522 | A1 | * | 4/2015 | Saito | H02K 21/185 368/80 |

\* cited by examiner

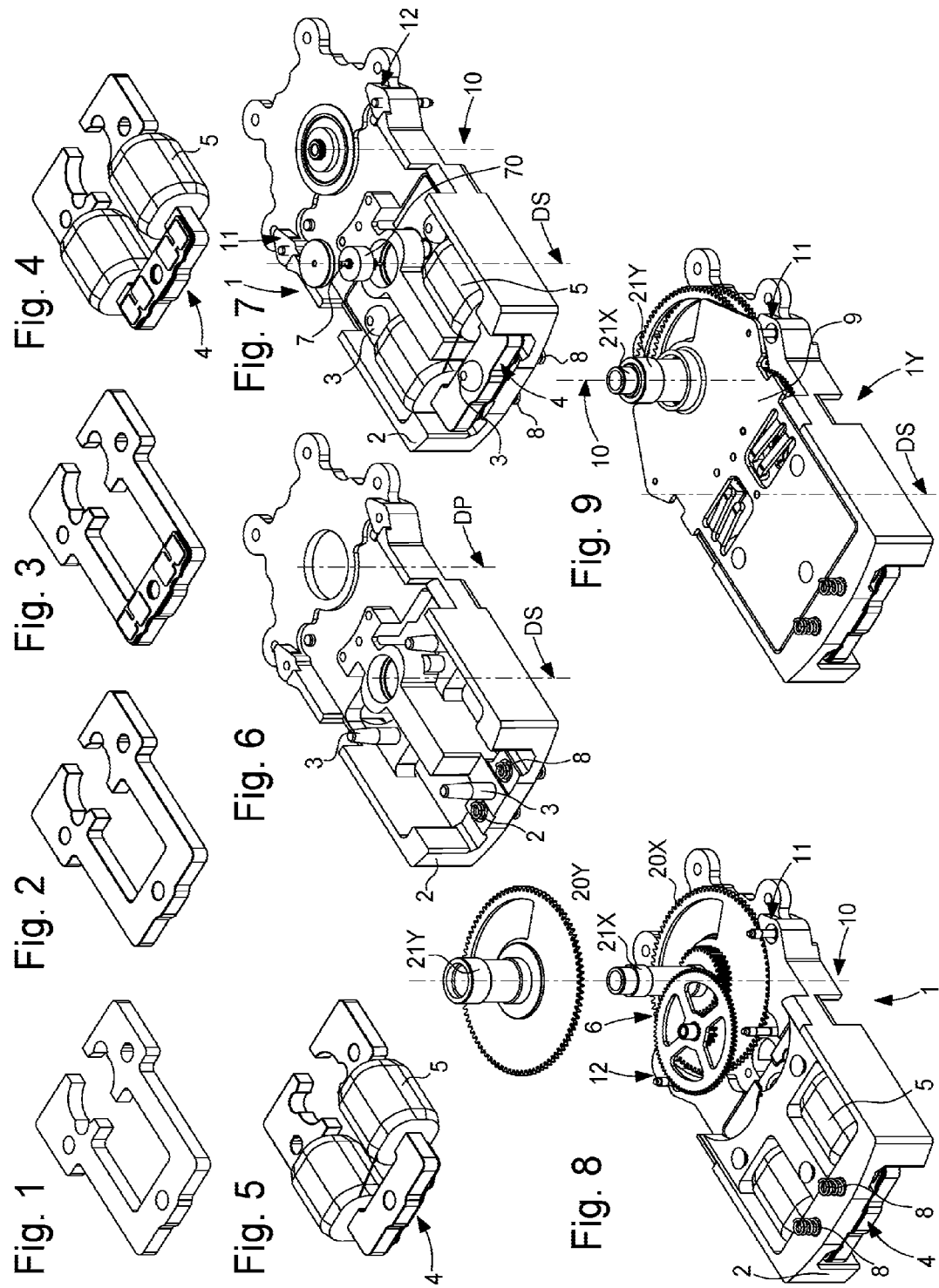

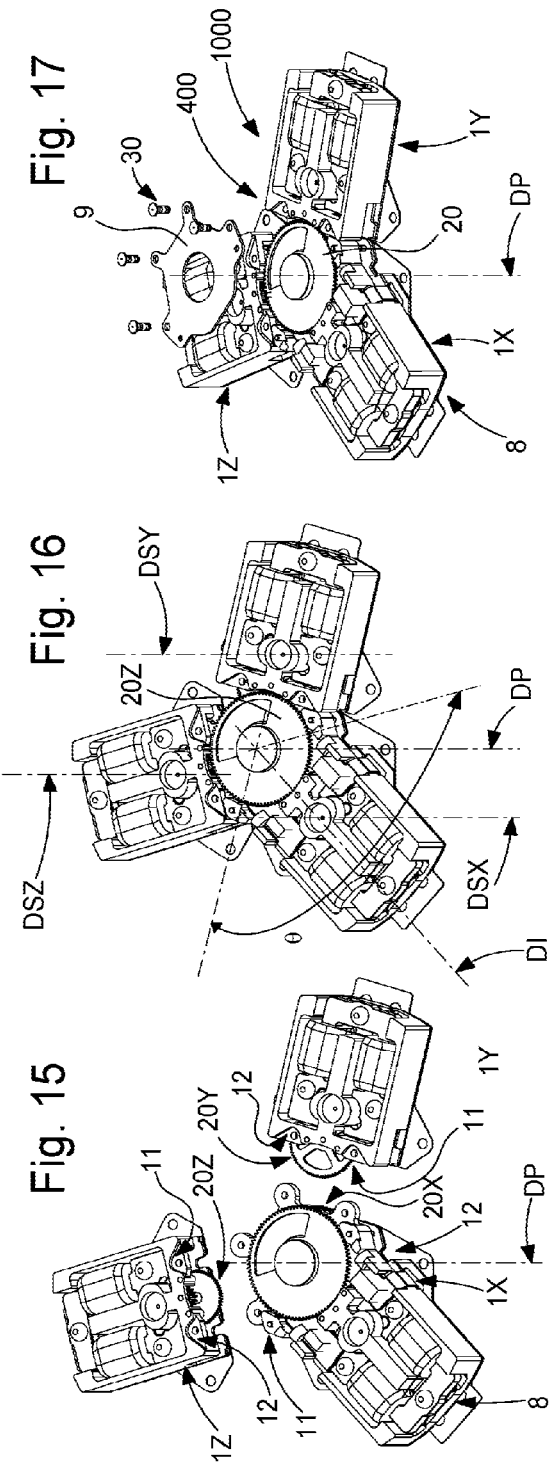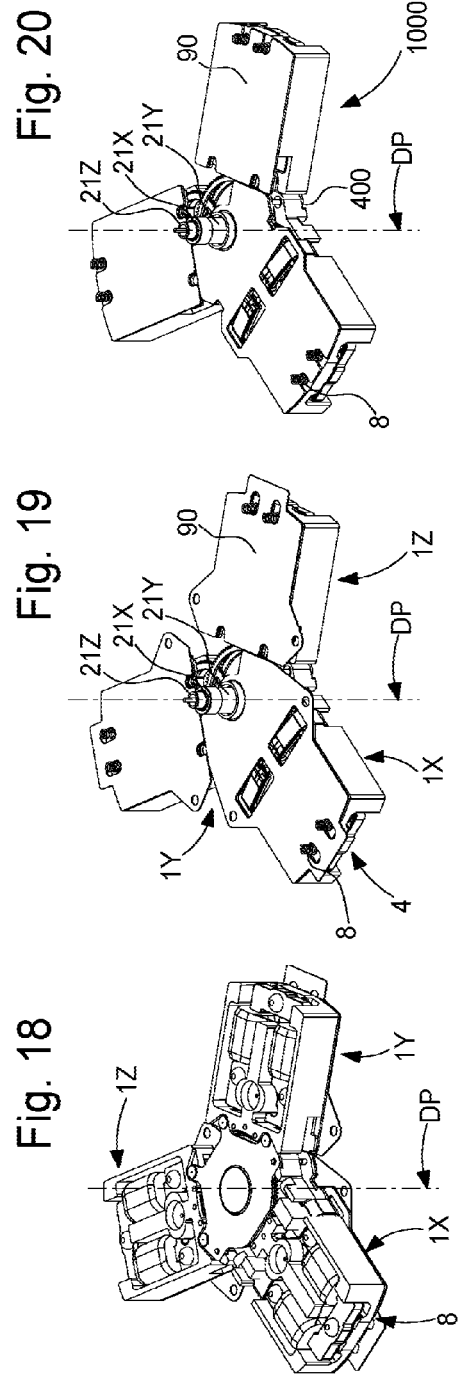

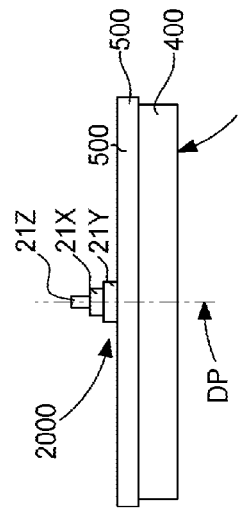
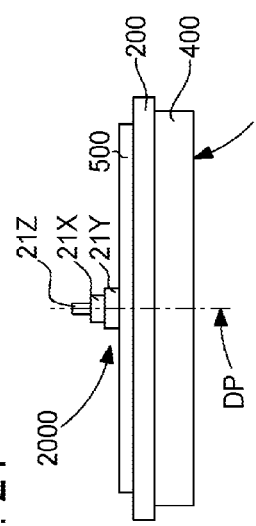
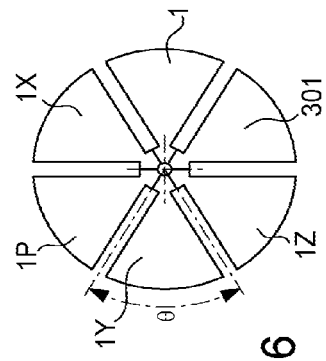
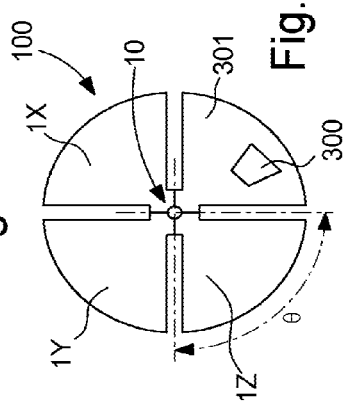
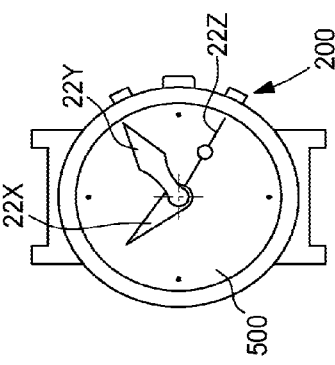
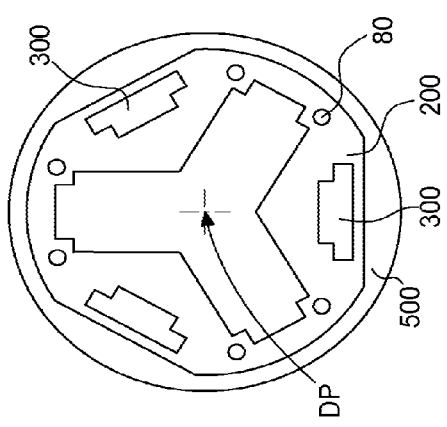

MOTOR MODULE FOR WATCHES

This application claims priority from European Patent application 15201458.5 of Dec. 21, 2015, the entire disclosure of which is hereby incorporated herein by reference.

FIELD OF THE INVENTION

The invention concerns a motor module for watches, with at least one motor comprising a coil and driving a gear train comprising an output wheel set on an output arbor.

The invention also concerns a motorization group for watches, comprising a power and control means.

The invention also concerns a watch including such a motorization group.

The invention mainly concerns the field of watches with electromechanical or electronic movements.

BACKGROUND OF THE INVENTION

There are known electromechanical or electronic watches, especially in the range by ETA Manufacture Horlogère Suisse SA, which comprise two connected hands, or three connected hands, or two independent hands, or one hand. However, there is no known motor module comprising at least three independent hands.

Incorporating a motor module in a non-horological structure, such as a printed circuit board (PCB) with a display, is not easy, for reasons of space.

For example, for a connected watch, the design requires the use of a battery, a PCB and a display. Known movements are not suitable for simple incorporation in this situation: insufficient finesse, no attachment to PCB, cumbersome brass main plates.

EP Patent Application 2813904A1 in the name of ETA SA MANUFACTURE HORLOGERE SUISSE discloses an electronic timepiece movement equipped with a motor comprising a stator and a permanent-magnet rotor situated in a stator hole, the stator defining at least two magnetic poles respectively comprising at least two pole shoes extending at the periphery of the hole. The motor includes at least one coil respectively mounted around at least one core. The two pole shoes and the core form together a first part made of ferromagnetic material formed by or including a one-piece plate forming both the two pole shoes and the core. An end portion of the core is connected to at least one corresponding pole shoe by a second part, defining a base plate or a main plate made of magnetic material, to which the first part is secured and on which elements of the electronic timepiece movement are at least partially mounted.

FR Patent Application 2518775A1 in the name of JUNG-HANS discloses a timepiece mechanism comprising a printed circuit board controlling the movement, and a support plate retaining the printed circuit board, for an electromechanical transducer driving a train for moving an under-dial work, inserted in a case with two shells, the under-dial work being positioned on the front shell side, in front of the support plate, whereas the train is secured on the back shell side, behind the support plate thereon, to the third wheel passing through the support plate and its pinion and penetrating the under-dial work, and the semiconductor wafer is attached to the support plate of substantially planar shape at a short distance from the latter, and is connected thereto by pins, which are welded to the semiconductor wafer plating intended for the conductive strips, and anchored as coil connecting pins in a coil core of the stator, which is carried by a stator stack of the stepping motor, positioned in the area of its rotor opening in a positive locking shape arrangement behind the support plate, resting flat thereon, the semiconductor wafer then encompassing, in an arc, the area occupied in front of the support plate by the centre wheel (minute wheel) and the hour wheel of the under-dial work and carrying, in front of the back wall of the case, beside and/or underneath the gear wheels, the components of the electronic control assembly of the movement.

SUMMARY OF THE INVENTION

The invention therefore concerns the development of a new movement architecture, capable of minimum thickness, ideally reduced to the thickness of the coils that generally form the most voluminous components of motors, this architecture permitting the control and display of the simplest to the most complex functions.

To this end, the invention concerns a motor module.

The invention also concerns a motorization group for watches.

The invention also concerns a watch including such a module or such a motorization group.

BRIEF DESCRIPTION OF THE DRAWINGS

Other features and advantages of the invention will appear upon reading the following detailed description, with reference to the annexed drawings, in which:

FIGS. 1 to 5 represent schematic perspective views of the steps of preparation and assembly of a U-shaped motor used in an advantageous variant of a motor module according to the invention.

FIGS. 6 to 9 represent schematic perspective views of the steps of preparation and assembly of an hour/minute motor module according to the invention.

FIGS. 15 to 20 represent schematic perspective views of a motor assembly according to the invention, with a main motor module and two nearby motor modules, arranged to control the movement of independent hands (not shown in the Figures).

FIG. 21 illustrates, in a side view, a particular embodiment of a motor unit according to the invention, with a motor assembly added to a structure, based on a flex print bonded to a dial, this structure carrying electronic circuits, and in a front view in FIG. 22, which shows electrical connection housings for the motor modules.

FIG. 23 is a side view similar to FIG. 21, showing a self-supporting motor assembly secured directly to the dial.

FIG. 24 represents a schematic top view of a motor assembly comprising three motor modules including one main motor module, and, in the same plane, a control sector which carries power and control means.

FIG. 25 represents, in a similar manner to FIG. 24, a motor assembly comprising four motor modules including a main motor module, and, in the same plane, a control sector that carries power and control means and a passive intermediate dial train module.

FIG. 26 shows a schematic, front view of a watch comprising three hands driven by a motorization group according to the invention.

DETAILED DESCRIPTION OF PREFERRED EMBODIMENTS

Figure 12:
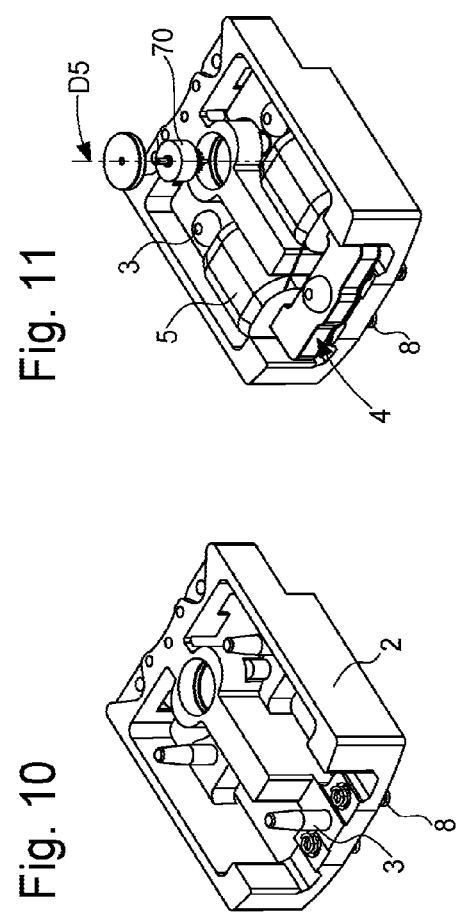
FIGS. 10 to 12 represent schematic perspective views of the steps of preparation and assembly of a seconds motor module according to the invention.

The invention concerns a motor module 1 for watches, with at least one motor 4 comprising a coil 5 and driving a gear train 6 comprising an output wheel set on an output arbor 7. Naturally, this gear train 6 may be limited simply to the output wheel set. The Figures illustrate a non-limiting example embodiment, with bipolar single-phase motors 4, comprising a stator chamber 4 for receiving a rotor 70 which drives gear train 6, not shown in detail in the Figures.

According to the invention, motor module 1 comprises main connectors 8, particularly plug-in connectors, for mechanical and/or electrical connection to a structure 200 or to another motor module 1, and flat, at least mechanical, links 11, 12. These flat links 11, 12 are thus called flat, since they are arranged to cooperate in a geometrically indexed attachment, in a plane perpendicular to output arbor 7, with another motor module 1, so as to form, by assembly, a stiff, self-supporting unit. Naturally, the components forming these flat links 11, 12 are not necessarily flat. In an advantageous variant, these flat links 11, 12 may also comprise particular electrical connectors, for example to a power circuit, and a data bus, for powering and controlling coils 5. Each coil 5 is electrically connected to two main connectors 8, particularly plug-in connectors, or to two links 11, 12, when these flat links 11, 12 are also electrical power and/or control links.

Preferably, main connectors 8 are at least electrical connectors, which may be plug-in connectors of the press-fit type, or contact springs, or similar.

More particularly, these main connectors 8 only form the electrical connection.

The motor module 1 described here is more particularly devised for a watch, but it is understood that its arrangement can be transposed to the motorization of a precision instrument, or a scientific instrument, or suchlike, of reduced dimensions. These applications, which are accessible to those skilled in the art upon reading the present description, are not described in detail here.

FIGS. 1 to 5 illustrate the steps of preparation and assembly of a U-shaped motor used in an advantageous variant of a motor module according to the invention: stamping a stator made of FeSi or similar in FIG. 1, complete insulation coating in FIG. 2, bonding the coil circuit in FIG. 3, flyer winding in FIG. 4, passing the wire between the coils in FIG. 5.

In a non-limiting example embodiment illustrated by the Figures, motor module 1 comprises a main plate 2 comprising attachment means 3 for holding in position at least one motor 4. This motor 4 comprises at least one coil 5 and is arranged to drive a gear train 6, whose wheel sets all pivot about parallel axes, and gear train 6 comprises at least one secondary output arbor 7. This output arbor 7 defines a secondary pivot axis DS and is either arranged to carry an output wheel set pivoting about secondary pivot axis DS, or directly comprises the output wheel set. In this example, motor module 1 comprises, inserted in main plate 2, main connectors 8, particularly of the contact spring, plug-in, snap-fit type, for mechanical and electrical connection of motor module 1 to ad hoc housings 80 of an external structure 200 or to another motor module 1. Naturally, conversely, motor module 1 can comprise housings 80 that receive main connectors 8, particular plug-in connectors, of an external structure 200, or to another motor module 1.

In an advantageous variant, motor module 1 comprises at least one sensor 600, which can, in particular, form means for detecting the position of the gear trains, and in particular of its own gear train 6.

Motor module 1 may also be mechanically attached to a structure 200, or to another motor module 1 by adhesive, particularly double-sided adhesive, screws, thermoformed mushroom shaped studs or other means. When structure 200 is an electronic board or printed circuit board (PCB), housings 80 are vias in the PCB, and main connectors 8, notably plug-in connectors, are advantageously elastically deformable elements called press-fits, or contact springs. Some of the Figures show a cover 9, notably in the form of a thermoformed bridge, ensuring the holding of the output wheel set, and which advantageously comprises a guide member for output arbor 7 and/or the arbors of gear train 6.

Link means 11 and complementary link means 12 can be made in a similar manner. An advantageous embodiment favouring the parallel insertion of the motor modules in relation to each other in the direction of their output arbors 7, consists in the use of resilient connectors, in the form of flexible strips, or compression springs, or other elements, which have the advantage of combining good mechanical strength, and permitting an electrical connection. A plurality of such resilient connectors may be used, in order to separate the electrical circuits, for example the power circuits and control circuits.

Link means 11 are arranged to cooperate in a link attachment, in a plane perpendicular to the secondary pivot axis DS, with complementary link means 12 of another motor module 1, and complementary link means 12 are arranged to cooperate in a link attachment, in a plane perpendicular to secondary pivot axis DS, with link means 11 of another motor module 1.

Preferably, for maximum use of space, and simplification of the gear trains, and therefore better efficiency, link means 11 and complementary link means 12 define, for each motor module 1, an opening angle θ of a sector extending from a main pivot axis DP, and motor module 1 is inscribed in said sector.

FIGS. 6 to 9 illustrates the steps of preparation and assembly of an hour/minute motor module 1Y according to the invention. FIG. 6 shows the preparation of a main plate 2, notably achieved by injection, with assembly studs 3, and the equipping thereof with contact springs 8. FIG. 7 shows the incorporation of a mounted stator, corresponding to the U-shaped motor of FIG. 5, and the attachment thereof by thermal riveting on studs 3, and the provision of a centre tube, washer, pivot pins, rotor 70 on its arbor 7 and an associated cover. FIG. 8 shows the assembly, in this particular case, of a minute wheel 20X with its tube 21X, of an intermediate wheel, and of an hour wheel 20Y with its tube 21Y. FIG. 9 shows the closing thereof with a thermal riveted bridge forming cover 9.

Figure 11:
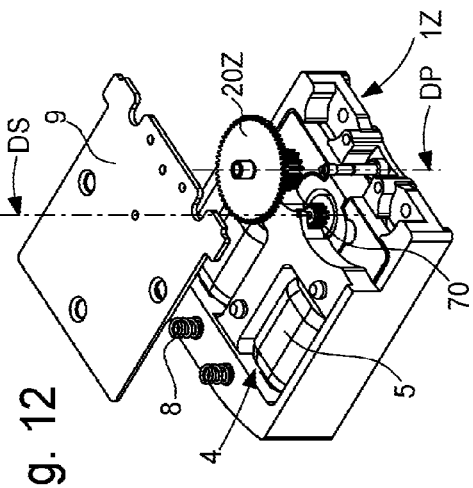
Figure 10:
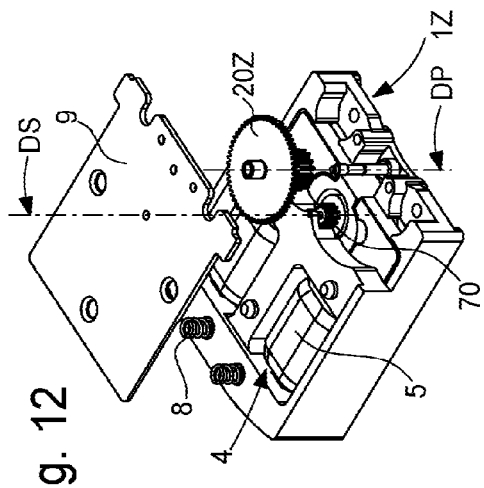
Figure 14:
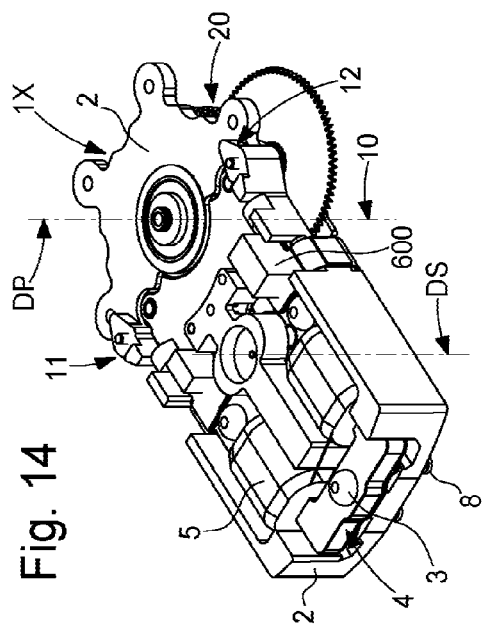
FIGS. 13 and 14 represent schematic perspective views of a main motor module according to the invention.
Figure 13:
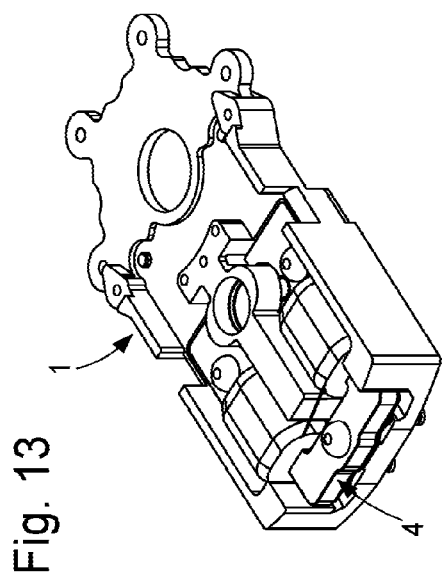

Likewise, FIGS. 10 to 12 illustrate the steps of preparation and assembly of a seconds motor module 1Z; the preparation of main plate 2 in FIG. 10, the incorporation of a mounted stator in FIG. 11, and the assembly of a seconds wheel 20Z in FIG. 12, and closing by means of a thermal riveted bridge forming cover 9. FIGS. 13 and 14 illustrate a main motor module 1X, with an elongated base plate 2, in FIG. 13 with the assembled motor 4 and the output wheel, and in FIG. 14 with a sensor module 600 on a flexible PCB, thermal riveted on the motor.

FIGS. 15 to 20 illustrate the mounting of a motor assembly 400, formed of main motor module 1X of FIG. 14, hour/minute motor module 1Y, and seconds motor module 1Z of FIG. 12: assembly of the motor modules to each other in FIG. 15, through the cooperation of their link means 11 and complementary link means 12, the insertion of a seconds wheel 20Z in FIG. 16, the insertion of a retaining cover plate 9 in FIG. 17, with the driving in of studs 30, the result of which is illustrated in FIG. 18, in FIG. 19 the insertion of a double-sided adhesive 90 for attachment on a PCB, and the finished motor assembly 400 in FIG. 20.

FIGS. 15 to 20, 22, 27, 28 represent three motor modules 1: 1X, 1Y, 1Z with an opening angle of 120°, devised for use with three hands or displays.

FIG. 24 illustrates an embodiment with an opening angle of 90° with three motor modules 1: IX, IY, 1Z, assembled with a control sector 301 which carries power and control means 300.

FIG. 25 illustrates an embodiment with an opening angle of 60°, with three motors 1: 1X, 1Y, 1Z, assembled with a passive sector 1P, without a motor, of the same size as the motor modules, and which has only an intermediate wheel function, for example for coupling a minute wheel to an hour wheel, or suchlike, also assembled with a control sector 301, and with another motor module 1, pre-arranged for another display.

The insertion of motor modules 1 with respect to each other, to come close to the axis of main pivot axis DP, depends on how flat connections 11, 12 are achieved. In a particular embodiment, the bisector of opening angle θ derived from main pivot axis DP is a direction of insertion DI passing through the secondary pivot axis DS of an output wheel set. In other particular embodiments, direction of insertion DI is oblique with respect to this bisector. In another particular embodiment, two main connectors 8, notably plug-in connectors, define, by design, with secondary pivot axis DS, direction of insertion DI.

FIG. 14 illustrates a motor module 1, which is a main motor module 1X, and which carries, for example on a main plate 2, a main arbor 10 which defines a main pivot axis DP parallel to and remote from secondary pivot axis DS of the output arbor 7 comprised therein.

As seen in FIG. 14, main arbor 10 carries at least one idler receiving wheel 20, which is arranged to be driven by an output wheel set of main motor module 1X.

More particularly, main arbor 10 carries at least one particular idle receiving wheel 20, arranged to be driven by a particular wheel set of another motor module 1, which is nearby 1, 1Y, 1Z, assembled directly or indirectly to main motor module 1X by link means 11 and complementary link means 12. "Indirect assembly" means, in particular, that this nearby motor module may not be adjacent to main motor module 1X, but separated therefrom by at least one other motor module 1, or module having the same interface features: for example in FIG. 25, modules 1Y and 1Z are separated from main motor module 1X, on a first side by a passive intermediate sector 1P, and on the other side by a control sector 301.

Preferably, main arbor 10 carries a plurality of idle, coaxial, receiving wheels which are independent of each other and each arranged to be driven by an output wheel set of main motor module 1X or another nearby motor module 1, assembled directly or indirectly to main motor module 1X by flat links 11, 12.

The invention also concerns a motorization group 1000 for watches, comprising power and control means 300, and such a main motor module 1X, electrically connected by main connectors 8, notably plug-in connectors, or by flat links 11, 12, at least, either at least to a structure 200 also comprised in motorization group 1000 to form therewith a motor unit 100, or to at least one other motor module 1 comprised in motorization group 1000 to form therewith a motor assembly 400. More particularly, this main motor module 1X is electrically connected in this manner, both to such a structure 200, and to at least one other motor module 1 comprised in motorization group 1000, to form therewith a motor assembly 400.

In a first variant, motorization group 1000 is such a motor unit 100, comprising a structure 200 and one such main motor module 1X. Main connectors 8, notably plug-in connectors, for mechanical and electrical connection of main motor module 1X, are arranged to cooperate in a complementary manner with housings 80 comprised in structure 200, some of these housings 80 are electrically connected to power and control means 300, comprised in structure 200 or which are actually electrically connected to structure 200.

In embodiments with two, or three, or more modules, motor unit 100 also comprises at least one other motor module 1, 1Y, 1Z, near to main motor module 1X, and assembled directly or indirectly to main motor module 1X by flat links 11, 12. This other nearby motor module 1, 1Y, 1Z carries a particular output wheel set meshing with a particular idle wheel 20, 20Y, 20Z, fitted on main arbor 10 of main motor module 1X. Main plug-in connectors 8, for mechanical and electrical connection, comprised in each nearby motor module 1, are arranged to cooperate in a complementary manner with suitable housings 80 of structure 200. Of course, it is possible to attach a single module to the structure, notably to the PCB, and attach the other modules to the latter, or to first attach these various modules to each other, and then attach the assembly thereby formed to the structure or the PCB, particularly by means of double-sided adhesive or suchlike.

In a second variant, motorization group 1000 is a such a motor assembly 400, comprising one such main motor module 1X, and at least one other nearby motor module 1, 1Y, 1Z, assembled and directly or indirectly electrically connected to main motor module 1X by flat links 11, 12. This other nearby motor module 1, 1Y, 1Z carries a particular output wheel set meshing with a particular idle wheel 20, 20Y, 20Z, fitted on main arbor 10 of main motor module 1X.

More particularly, in an advantageous embodiment, this motor assembly 400 forms a self-supporting structure. Thus, the precision required for the gear trains is ensured by the actual motor assembly 400 and by the modules that it comprises.

In a particular variant, each motor module 1 comprised in motorization group 1000 is a motor module 1 inscribed in a sector, as explained above, and the opening angles θ of these motor modules 1 are equal, with an angular value that is an integer sub-multiple of 360°, and the flat links 11, 12 of these motor modules 1 are arranged for a circular connection of motor modules 1 around main arbor 10.

In an advantageous embodiment, flat links 11, 12 between motor modules 1 are arranged for both a mechanical and electrical connection between motor modules 1.

In a particular and advantageous manner, main arbor 10 carries a plurality of receiving wheels 20: 20X, 20Y, 20Z, which are idle, independent of each other, and each arranged to be driven by an output wheel set of main motor module 1X or of another nearby motor module 1, 1Y, 1Z. Each said receiving wheel 20: 20X, 20Y, 20Z, carries a tube 21, 21X, 21Y, 21Z, for receiving a display member, such as a hand, not shown in the Figures. All of tubes 21: 21X, 21Y, 21Z, carried respectively by receiving wheels 20: 20X, 20Y, 20Z, fitted on main arbor 10, are coaxial and interior to each other. Main motor module 1X comprises a main output wheel set, whose toothing is axially positioned at a height suitable for meshing with a main receiving wheel 20X situated at the same height on main arbor 10. Each said receiving wheel 20: 20X, 20Z, other than main receiving wheel 20X, is positioned on main arbor 10 at a particular height at which it can mesh with a particular and corresponding output wheel set, comprised, at the same height, in another nearby motor module 1: 1Y, 1Z.

Figure 41:
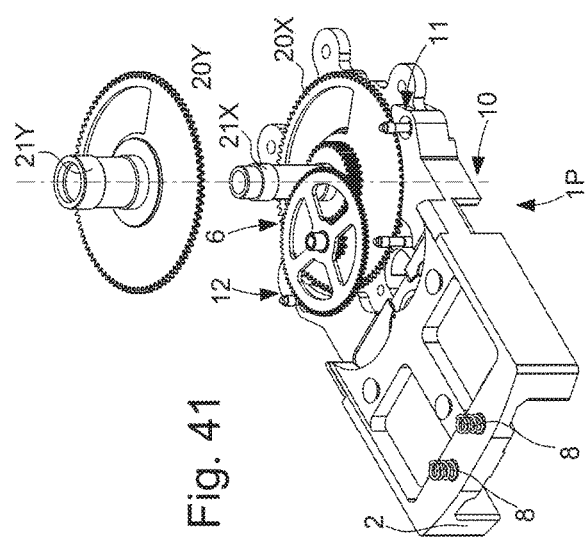
FIG. 41 represents a schematic perspective view of an exemplary passive sector.

In a particular embodiment, as seen in FIG. 25, motor unit 100 comprises at least one passive sector IP (shown in detail in FIG. 41), which has the same size, and which has the same geometry, gear train 6, output wheel set 20, main connectors 8 and flat links 11 12, as the motor modules 1: 1X, 1Y, 1Z that are near thereto. However, this passive sector 1P is devoid of motor 4. This passive module IP comprises an input wheel driven by a receiving wheel 20: 20X of main motor module 1X, or 20Y, 20Z of another motor module 1: 1Y, IZ nearby, this input wheel being arranged to drive the output wheel set of passive wheel set 1P, by means of its gear train in which each wheel set is idle.

In a particular embodiment, the power and control means 300 are arranged to control at least one motor module 1 with a time signal, to effect a display of a time magnitude with the corresponding display member of the motor module 1 concerned.

In a particular embodiment, the power and control means 300 are arranged to control a plurality of motor modules 1: 1X, 1Y, 1Z, with different time signals, to effect a display a different time magnitude on each of the displays of the motor modules 1: 1X, 1Y, 1Z concerned.

Preferably, each receiving wheel 20, 20X, 20Y, 20Z, carries a tube 21, 21X, 21Y, 21Z, for receiving a display.

Preferably, all of tubes 21: 21X, 21Y, 21Z, carried by receiving wheels 20: 20X, 20Y, 20Z, fitted on the same main arbor 10, when main motor module 1X carries more than one receiving wheel 20, are coaxial and interior to each other.

The height of receiving wheels 20, 20X, 20Y, 20Z is arranged to match the respective height of the output wheel sets of the motor modules 1 that cooperate about the same main arbor 10. Thus, in particular, main motor module 1X comprises a main output wheel set, whose toothing is axially positioned at a height suitable for meshing with a main receiving wheel 20X located at the same height on main arbor 10. Also, each receiving wheel 20, 20Y, 20Z, other than main receiving wheel 20X, is positioned on main arbor 10 at a particular height at which it can mesh with a particular output wheel set comprised, at the same height, in another nearby motor module 1, 1Y, 1Z, directly or indirectly assembled to main motor module 1X by link means 11 and complementary link means 12.

The invention further comprises a motor unit 100, comprising a structure 200 and at least one main motor module 1X. Main connectors 8, notably plug-in connectors, for mechanical and electrical connection of main motor module 1, are arranged to cooperate in a complementary manner with housings 80 comprised in structure 200, some of which are electrically connected to power and control means 300, comprised in structure 200, or which are electrically connected to structure 200.

Preferably, this motor unit 100 also includes at least one other nearby motor module 1: 1Y. 1Z, directly or indirectly assembled to main motor module 1X by link means 11 and complementary link means 12, and this other nearby motor module 1 carries a particular output wheel set meshing with a particular idle wheel 20 fitted on main arbor 10 of main motor module 1X.

In a particular embodiment of this motor unit 100, the main connectors 8, notably plug-in connectors, for mechanical and electrical connection, comprised in each nearby motor module 1, are arranged to cooperate in a complementary manner with housings 80 of structure 200.

In a particular embodiment of motor unit 100, each motor module 1 comprised therein is inscribed in a sector, and the opening angles θ of motor modules 1 are equal, with an angular value that is an integer sub-multiple of 360°.

However, an assembly may very well comprise modules which have different opening angles between them, and may also cover an angle of less than 360°, although an assembly over 360°, even achieved with one or more artificial modules each limited to a main plate 2, is more advantageous in terms of the overall stiffness of this assembly.

In a particular embodiment of motor unit 100, link means 11 and complementary link means 12 of motor modules 1 comprised therein are arranged for a circular connection of motor modules 1 around main arbor 10.

In a particular embodiment of motor unit 100, link means 11 and complementary link means 12 of motor modules 1 are arranged for both a mechanical and electrical connection between motor modules 1.

In a particular embodiment of motor unit 100, main arbor 10 carries a plurality of idle receiving wheels 20, which are independent of each other and each arranged to be driven by an output wheel set of main motor module 1X or of another nearby motor module 1. Each receiving wheel 20 carries a tube 21 for receiving a display. All the tubes 21 carried by receiving wheels 20, fitted on main arbor 10, when main motor module 1X carries more than one receiving wheel 20, are coaxial and interior to each other. Main motor module 1X comprises a main output wheel set, whose toothing is axially positioned at a height suitable for meshing with a main receiving wheel 20 situated at the same height on main arbor 10. Also, each receiving wheel 20, other than main receiving wheel 20, is positioned on main arbor 10 at a particular height at which it can mesh with a particular output wheel set, comprised, at the same height, in another nearby motor module 1.

In a particular embodiment of motor unit 100, motor unit 100 comprises at least one module which is a passive sector 1 P as described above.

In a particular embodiment of motor unit 100, motor unit 100 includes power and control means 300, connected to or incorporated in structure 200, for controlling at least one motor module 1 with a time signal, to effect a display of a time magnitude with the corresponding display of the motor module 1 concerned.

In a particular embodiment of motor unit 100, power and control means 300 are arranged to control a plurality of motor modules 1 with different time signals, to effect a display of a different time magnitude on each of the displays of the motor modules 1 concerned.

In a particular embodiment, structure 200 is substantially annular, and at least partially surrounds motor modules 1.

In a particular embodiment, compatible with the preceding embodiment, structure 200 comprises at least one portion made in the form of a sector occupying the same geometric space, in plane projection perpendicular to the axes of the wheel sets, and comprises flat links 11, 12 for connection to motor modules 1.

The invention also concerns a motor assembly 400 comprising a main motor module 1X, and at least one other nearby motor module 1, directly or indirectly assembled to main motor module 1X by link means 11 and complementary link means 12, and this other nearby motor module 1 carries a particular output wheel set meshing with a particular idle wheel 20 fitted on main arbor 10 of main motor module 1X.

All the particular features of the constituent motor modules are applicable to this motor assembly 400, which has the advantage of being self-supporting, and does not require a main plate or carrier structure.

In practice, it is generally easier to assemble the main plates 2 of the different modules 1 comprised in an assembly to each other, before the subsequent assembly of the trains in the centre, which avoids any gear train meshing problems. Any covers 9 of the modules are then mounted and enclose the trains and their pivot arbors.

In a particularly advantageous application, the invention can thus produce a modular motor with three hands, wherein the main minute motor module 1X drives, for example, the main minute receiving wheel 20X (or the hour wheel in a variant). Hour module 1Y and seconds module 1Z simply comprise gear trains 6Y and 6Z including the output wheels that mesh respectively on the hour receiving wheel 20Y and seconds receiving wheel 20Z mounted for free rotation on the main arbor of main motor module 1X. Each motor module 1 comprises a motor 4, here a U-shaped motor, notably wound by flyer. A conventional Lavet motor structure is also compatible with the architecture of the invention. The coil is distributed on each side, but, in the example of the Figures, there is only one coil 5, and thus one single phase motor 4 in this particular embodiment. Main connectors 8, notably plug-in connectors, are press-fits connected to coil 5, and, for example, inserted into a plastic main plate 2. Modules 1X, 1Y, 1Z can advantageously be made in the same injection mould, a simple insert matching the protuberance borne by main arbor 10 is sufficient to differentiate main motor module 1X from the others. Here, modules 1X, 1Y, 1Z are directly mounted on a PCB forming a structure 200, by means of press-fits. The press-fits for the control and power of each coil 5 are inserted in vias (i.e. metallized holes) in order to electrically connect them. Other press-fits or similar connectors, requiring no electrical connection, useful for the geometric arrangement and/or stiffness of the assembly, are inserted in holes in the PCB or vias that are not electrically connected, to ensure only mechanical functions.

The inter-modular mechanical connections advantageously allow one module to be centred and aligned with respect to another, and to maintain attachment in the correct geometric position. To this end, it is possible to use pins with thermoforming.

In this example, to display a hand, only the main motor module 1X is used. To display two independent hands, main motor module 1X and one of the other nearby motor modules 1Y or 1Z, are used, assembled to each other by flat links 11, 12. The assembly is mounted on the PCB in the same manner as main motor module 1X, by insertion of the press-fits. To display three independent hands 22X, 22Y, 22Z, the same procedure is performed as for two hands, using the other two nearby motor modules 1Y and 1Z.

To reduce costs, a passive module 1D, which comprises only a motion work can be used, for example for connecting the hour receiving wheel 20Y and the main minute wheel 20 of main motor module 1X. A motor module with two connected hands is thus achieved inexpensively. The addition of a third motor module 1 for example makes it possible to have an independent small seconds. The attachment of motor 4 can be achieved directly by press-fit on a standard PCB. There is no need to have a main plate, which is an advantage for a non-horological application.

The press-fit assembly avoids the need to weld the motor, as reflow soldering is impossible for a motor module due to the incompatible high temperature. Advantageously, the press-fit attachment includes the electrical connection for the coils, and possibly a capacitive DPR module.

Thus, with three almost identical modules 1X, 1Y and 1Z (and therefore reduced costs), it is possible to achieve a range of movements: one hand, two connected hands, two independent hands, three independent hands, two connected hands and one independent hand.

The fact that it is possible to dispense with the PCB is an advantage in terms of the thickness of the movement. The PCB may thus form only one of the sectors of the assembly.

Flat links 11, 12 may advantageously be achieved in the form of electrical contacts by compression springs moving into abutment on a motor module 1 or a PCB. A motor module 1 can be mechanically attached to another motor module 1, or to a PCB by adhesive, or screws, or thermoformed studs for example, or other means.

The Figures illustrate the use of a flexible circuit known as a flex print, which provides the advantage of finesse and the possibility of bends in the side areas to motor modules 1, and does not increase the total thickness. FIGS. 21 and 22 represent such a flex print, which thus forms a particular structure 200, bonded to a dial 500; a flex print can also be bonded to a display member or display. FIG. 20 represents a pre-assembled main motor module 1X, bonded to the flex print, notably with a double-sided adhesive, or attached by thermal deformation or suchlike, and with electrical connections via springs. The electrical or electronic components can be arranged laterally with respect to the motor module, which offers an advantageous total thickness, almost limited to the thickness of coil 5.

The case where electrical or electronic components are arranged both laterally and underneath the motor modules offers a higher number of functions, but with a slightly greater thickness.

The invention also concerns a watch 2000 comprising at least one such motor module 1, or one such motorization group 1000, or motor unit 100, or motor assembly 400.

Advantageously, structure 200 includes dial 500 of watch 2000, or is formed by dial 500.

FIGS. 27 to 40 represent different functional assemblies created with motor modules according to the invention.

Figure 28:
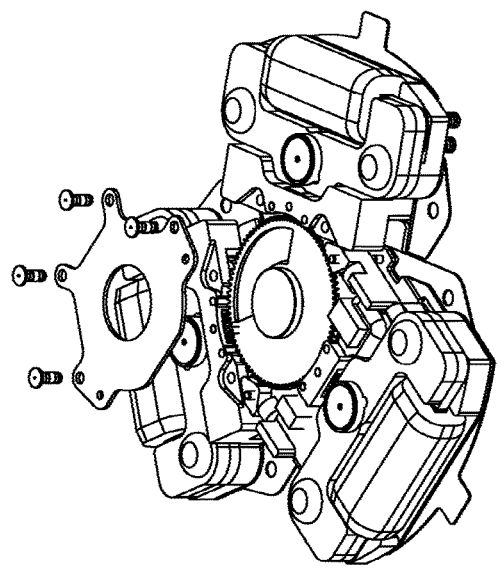
FIGS. 27 to 40 represent schematic perspective views of various functional assemblies created with motor modules according to the invention.
Figure 27:
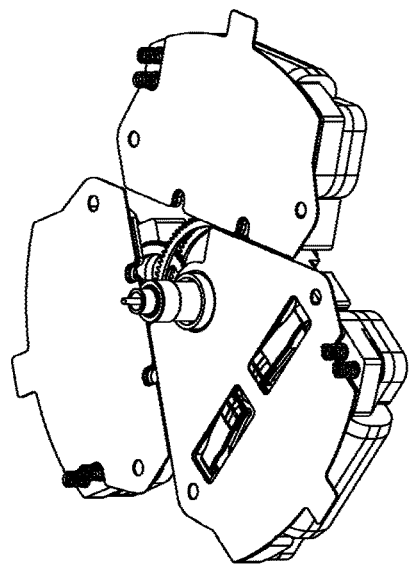

FIGS. 27 and 28 illustrate closed and open views of a Y-shaped configuration with three independent hands, one hand driven by each of three modules arranged at 120°.

Figure 29:
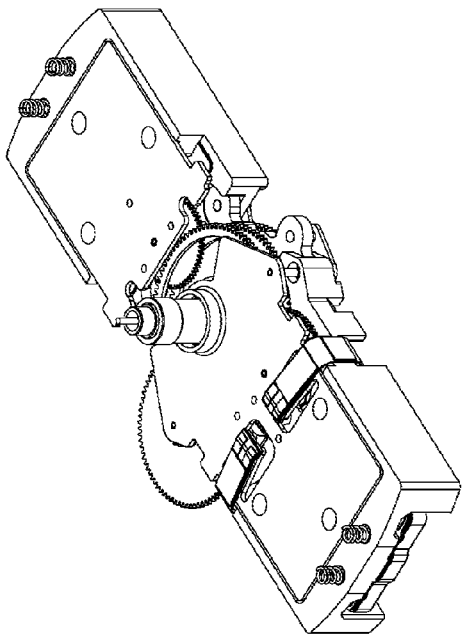
Figure 30:
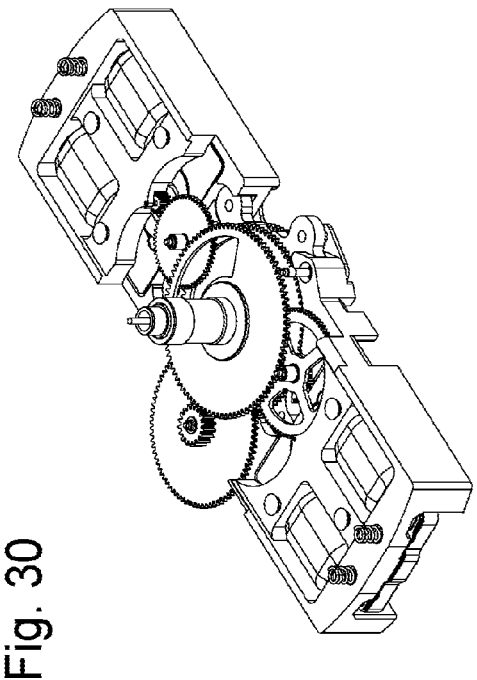

FIGS. 29 and 30 illustrate closed and open views of a straight configuration with two hands connected on a first module, and a second independent hand on a second module arranged at 180° from the first.

Figure 31:
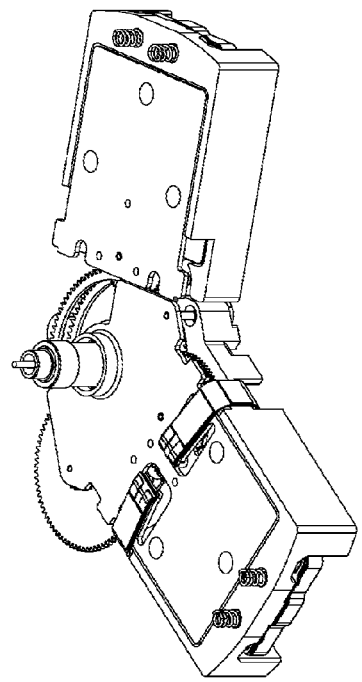
Figure 32:
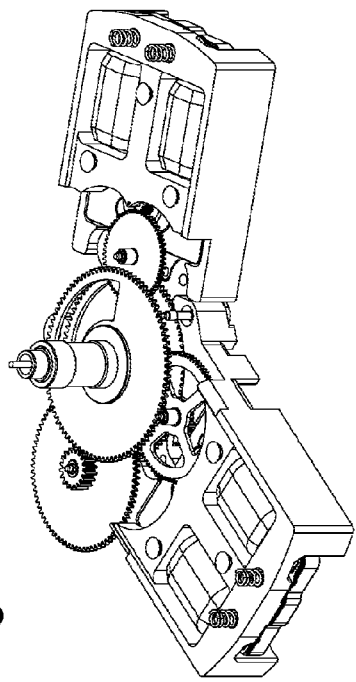

FIGS. 31 and 32 illustrate closed and open views of a V-shaped configuration with two hands connected on a first module, and a second independent hand on a second module arranged at 120° from the first.

Figure 33:
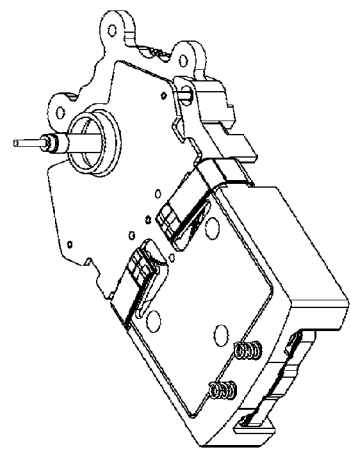
Figure 34:
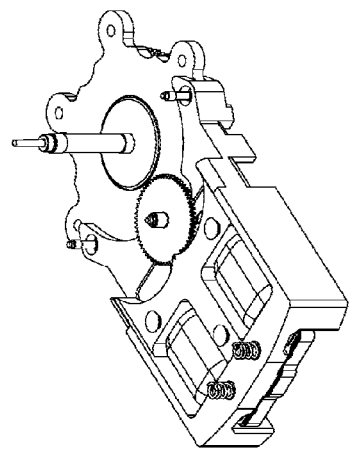

FIGS. 33 and 34 illustrate closed and open views of a configuration with a single module with two connected hands.

Figure 35:
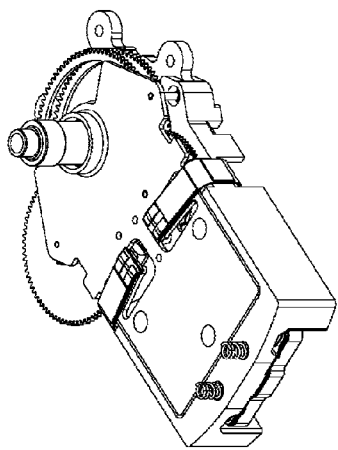
Figure 36:
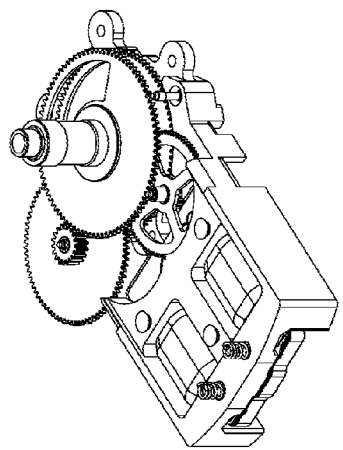

FIGS. 35 and 36 illustrate closed and open views of a configuration with a single module with one independent seconds hand.

Figure 37:
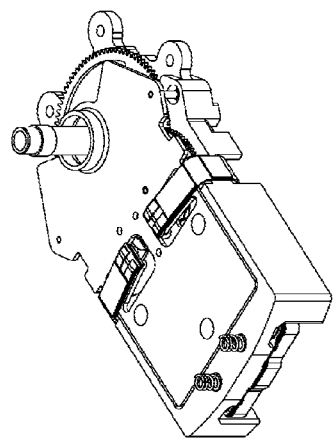
Figure 38:
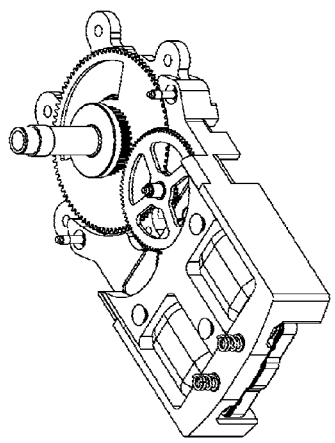

FIGS. 37 and 38 illustrate closed and open views of a configuration with a single module with one independent minute hand.

Figure 39:
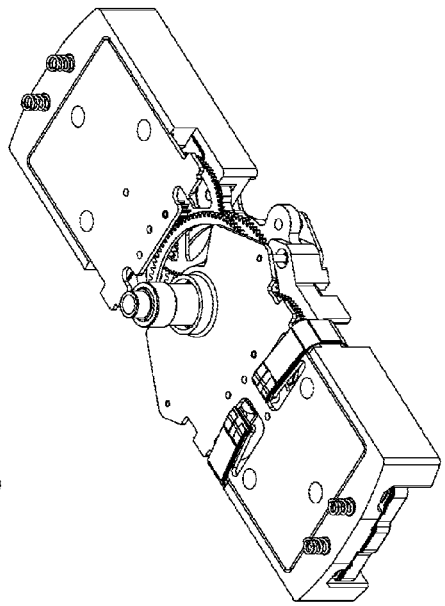
Figure 40:
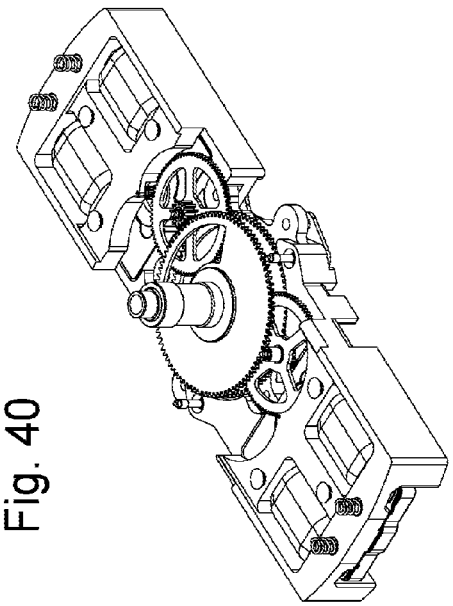

FIGS. 39 and 40 illustrate closed and open views of a straight configuration with two independent hands, here the hour and minute hands, each on a module arranged at 180° from the other.

The invention can therefore be used for complete centre, dependent and independent displays and for adopting a regulator type configuration with split displays in different areas of the watch, or with an off-centre small seconds or other display.

What is claimed is:

1. A motorization group, comprising:
a motor unit including a main motor module, another motor module, and at least one passive sector,
wherein said main motor module and said another motor module each comprise: a receiving wheel;
at least one motor comprising a coil and driving a gear train comprising an output wheel set on an output arbor;
main connectors for mechanical and/or electrical connection; and
flat links, said coil being electrically connected to two of said flat links or to said main connectors,
wherein said main motor module carries a main arbor parallel to said output arbor of the main motor module, and remote from said output arbor of the main motor module,
wherein said flat links of the main motor module and of the another motor module each comprise link means and complementary link means, said link means of the main motor module being arranged to cooperate in a link attachment, in a plane perpendicular to said output arbor of the main motor module, with said complementary link means of said another motor module,
wherein said link means and said complementary link means of said main motor module define an opening angle of a sector extending from a main pivot axis and said main motor module is inscribed in said sector, and
wherein said at least one passive sector has a geometry, gear train, output wheel set, main connectors and flat links, like said main motor module and said another motor module, but said passive sector is devoid of said motor, and said passive sector includes an input wheel driven by said receiving wheel of said main motor module or of said another motor module, said input wheel being arranged to drive said output wheel set of said passive sector via said gear train of said passive sector, every wheel set of the passive sector being idle.

2. The motorization group according to claim 1, wherein said main arbor carries at least one idle receiving wheel, arranged to be driven by said output wheel set of said main motor module.

3. The motorization group according to claim 2, wherein said main arbor carries at least one particular idle receiving wheel, which is arranged to be driven by said output wheel set of said another motor module, assembled to said main motor module by said flat links.

4. The motorization group according to claim 1, wherein said main arbor carries a plurality of idle receiving wheels, independent of each other, each carrying a tube for receiving a display, and each arranged to be driven by said output wheel set of said main motor module or of said another motor module assembled to said main motor module by said flat links, and wherein all said tubes carried by said receiving wheels, fitted on said main arbor, are coaxial and interior to each other.

5. The motorization group according to claim 4, wherein said main motor module comprises said output wheel set which is a main output wheel set, whose toothing is axially positioned at a height suitable for meshing with a main receiving wheel of said receiving wheels and which is situated at the same height as said main output wheel set on said main arbor, and wherein another receiving wheel of said receiving wheels is positioned on said main arbor at a particular height at which said another receiving wheel can mesh with said output wheel set comprised, at the same height, in said another motor module, assembled to said main motor module by said flat links.

6. The motorization group according to claim 1, further comprising power and control means configured to control the main motor module and the another motor module.

7. The motorization group according to claim 6, wherein said power and control means are arranged to control at least one of said main motor module and said another motor module with a time signal, to effect a display of a time magnitude with said display of said motor module concerned.

8. The motorization group according to claim 6, wherein said power and control means are arranged to control said main motor module and said another motor module with different time signals, to effect a display of a different time magnitude on each of said displays of said motor modules concerned.

9. The motorization group according to claim 1, wherein said motor unit further includes at least one other nearby motor module, directly or indirectly assembled to said main motor module by said flat links, and said other nearby motor module carrying an output wheel set meshing with a particular idle wheel fitted on said main arbor of said main motor module, and wherein main connectors for mechanical and electrical connection comprised in each said other nearby motor module are arranged to cooperate in a complementary manner with housings of a structure of the motorization group.

10. The motorization group according to claim 1, wherein said motor unit forms a self-supporting structure.

11. The motorization group according to claim 1, wherein said opening angle of said main motor module is equal to an opening angle of said another motor module, each opening angle having an angular value that is an integer sub-multiple of 360°, and wherein said flat links of said main motor module and of said another motor module are arranged for a circular connection of said main motor module and of said another motor module around said main arbor.

12. The motorization group according to claim 1, wherein said flat links of said main motor module and of said another motor module are arranged for a mechanical and electrical connection between said main motor module and of said another motor module.

13. The motorization group according to claim 1, wherein said main arbor carries a plurality of idle receiving wheels, independent of each other, and each arranged to be driven by said output wheel set of said main motor module or of said another motor module, and wherein each said receiving wheel carries a tube for receiving a display, wherein all said tubes carried by said receiving wheels, fitted on said main arbor, are coaxial and interior to each other, wherein said main motor module comprises said main output wheel set whose toothing is axially positioned at a height suitable for meshing with said main receiving wheel situated at the same height on said main arbor, and wherein said receiving wheel, other than said main receiving wheel, is positioned on said main arbor at a particular height at which said receiving wheel can mesh with said output wheel set comprised, at the same height, in said another motor module.

14. A watch comprising:
the motorization group according to claim 1.

* * * * *